United States Patent
Campbell et al.

(10) Patent No.: US 12,527,440 B2
(45) Date of Patent: *Jan. 20, 2026

(54) BATHING INSTALLATION USER INTERFACE PANEL WITH LARGE ACTIVE DISPLAY AREA

(71) Applicant: Balboa Water Group, LLC, Costa Mesa, CA (US)

(72) Inventors: Graham J. Campbell, Irvine, CA (US); Steven Kuo, Chino Hills, CA (US)

(73) Assignee: Balboa Water Group, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/943,751

(22) Filed: Nov. 11, 2024

(65) Prior Publication Data

US 2025/0064269 A1    Feb. 27, 2025

Related U.S. Application Data

(63) Continuation of application No. 18/084,426, filed on Dec. 19, 2022, now Pat. No. 12,137,848, which is a continuation-in-part of application No. 17/086,372, filed on Oct. 31, 2020, now Pat. No. 11,531,369.

(51) Int. Cl.
  *A47K 3/00*     (2006.01)
  *G06F 3/041*    (2006.01)
  *G06F 3/0488*   (2022.01)

(52) U.S. Cl.
  CPC ............ *A47K 3/001* (2013.01); *G06F 3/0412* (2013.01); *G06F 3/0488* (2013.01)

(58) Field of Classification Search
  CPC ...... A47K 3/001; G06F 3/0412; G06F 3/0488
  See application file for complete search history.

(56) References Cited

U.S. PATENT DOCUMENTS

| | | | | |
|---|---|---|---|---|
| 11,531,369 B2 * | 12/2022 | Campbell | ............... | A47K 3/001 |
| 12,137,848 B2 * | 11/2024 | Campbell | ............... | G06F 1/1643 |
| 12,275,355 B1 * | 4/2025 | Ciambriello | ............ | G06F 3/147 |
| 2017/0017315 A1 * | 1/2017 | Laflamme | ............. | G06F 3/0488 |

* cited by examiner

*Primary Examiner* — Peter D Mcloone
(74) *Attorney, Agent, or Firm* — Larry K. Roberts

(57) ABSTRACT

An exemplary embodiment of a user interface display panel includes a top or cover glass layer which extends to the perimeter of the panel housing. A touch-sensitive display layer is adhered to the bottom surface of cover glass layer to form a touch sensitive display assembly. In exemplary embodiments, the arrangement results in an active touch-sensitive display area significantly larger than display areas provided in the past by interface panels.

21 Claims, 17 Drawing Sheets

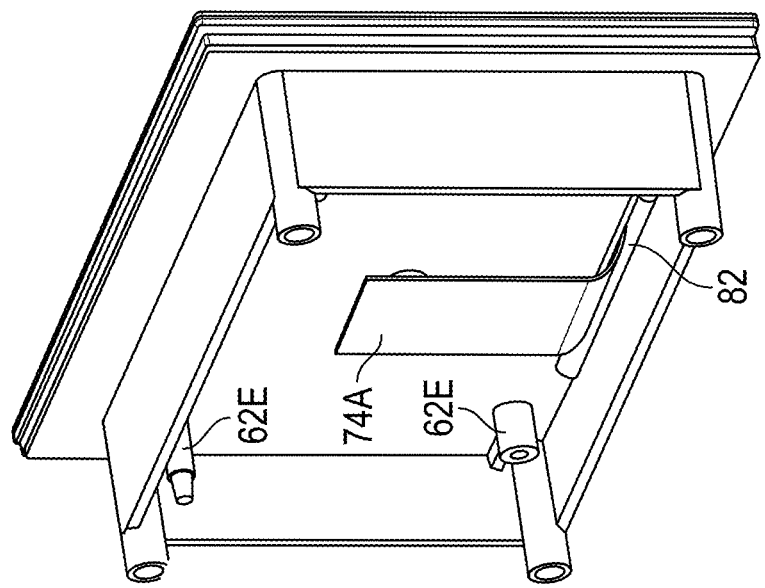
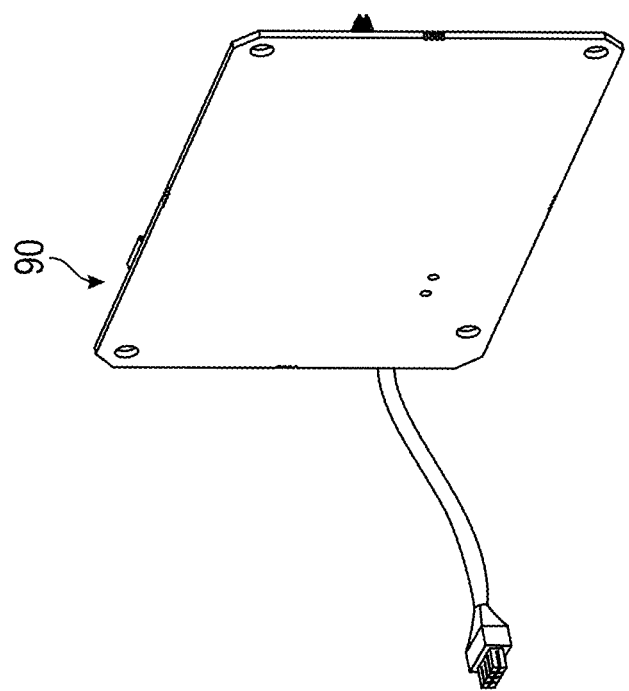
FIG. 9

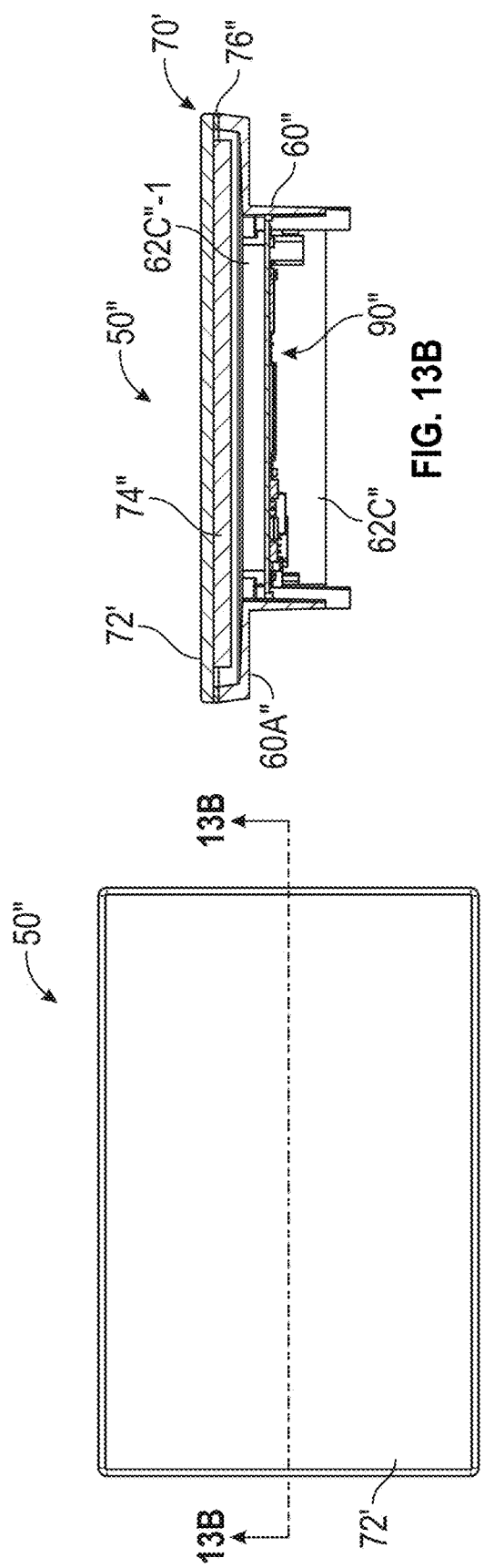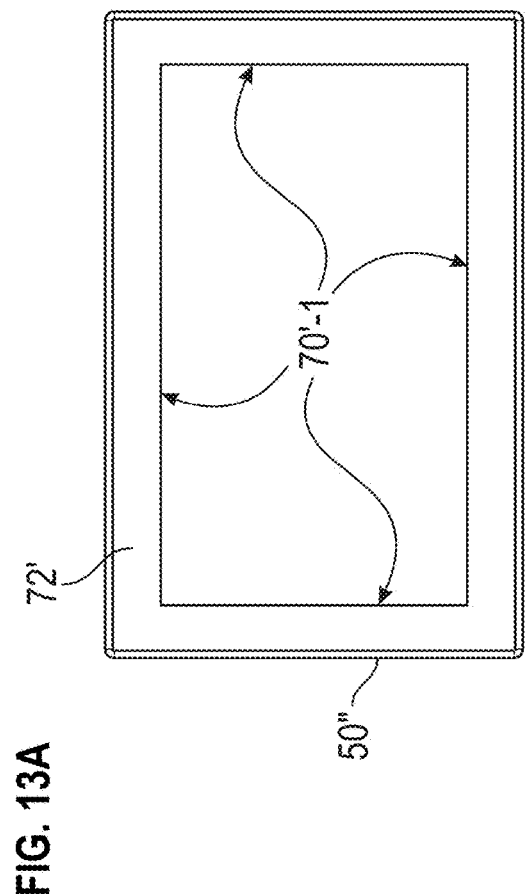
FIG. 13A
FIG. 13B
FIG. 13C

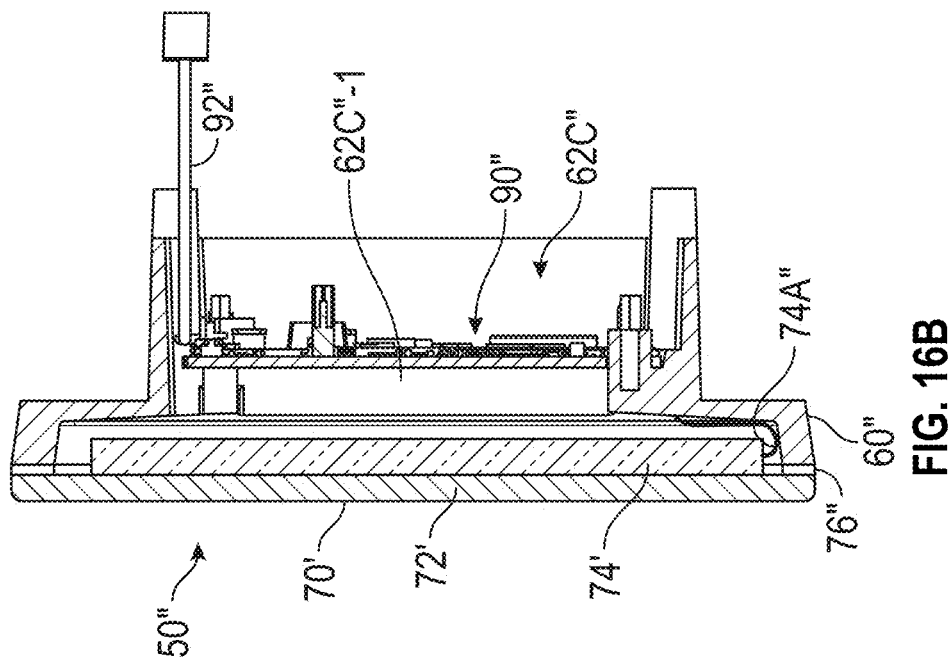
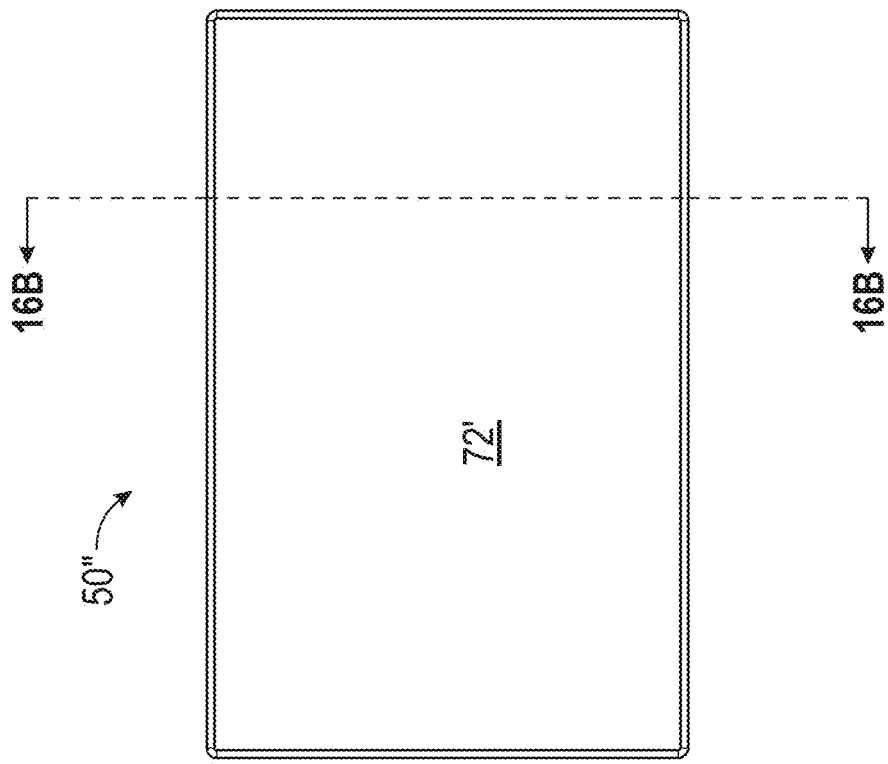
FIG. 16A
FIG. 16B

BATHING INSTALLATION USER INTERFACE PANEL WITH LARGE ACTIVE DISPLAY AREA

CROSS-REFERENCE TO RELATED APPLICATION

This application is a continuation of and claims priority to U.S. patent application Ser. No. 18/084,426, filed Dec. 19, 2022, and to U.S. patent application Ser. No. 17/086,372, filed Oct. 31, 2020, issued as U.S. Pat. No. 11,531,369, the entire contents of which applications are incorporated herein by this reference.

BACKGROUND OF THE INVENTION

This invention relates to touch screen user interface panels and, more particularity, to user interface display panels used in spas and whirlpool baths.

Known types of user interface panels include relatively smaller display active areas in relation to the area of the plastic support region. A goal of the invention is to provide a relatively large active display area while reducing the size of non-active area of the panel.

U.S. Pat. No. 9,069,201 describes one known type of user interface panel.

BRIEF DESCRIPTION OF DRAWINGS

Features and advantages of the disclosure will readily be appreciated by persons skilled in the art from the following detailed description when read in conjunction with the drawing wherein:

FIG. 9 is a bottom isometric view as in FIG. 8, with the sealant plug in place to seal the slot opening through which the ribbon cable from the touch-sensitive display is passed.

FIG. 13A is a top view of an alternate embodiment of a user interface panel using the housing structure of FIGS. 12A-12D. FIG. 13B is a simplified diagrammatic cross-sectional view taken along line 13B-13B of FIG. 13A, before sealant has been dispensed into the panel. FIG. 13C is a top view similar to FIG. 13A, with shading and arrows to show the large active region 70'-1 of the display assembly of the panel.

FIG. 16A is a top view of the user interface panel of FIG. 13A. FIG. 16B is a cross-sectional view taken along line 16B-16B of FIG. 16A.

DETAILED DESCRIPTION OF THE INVENTION

Figure 1:
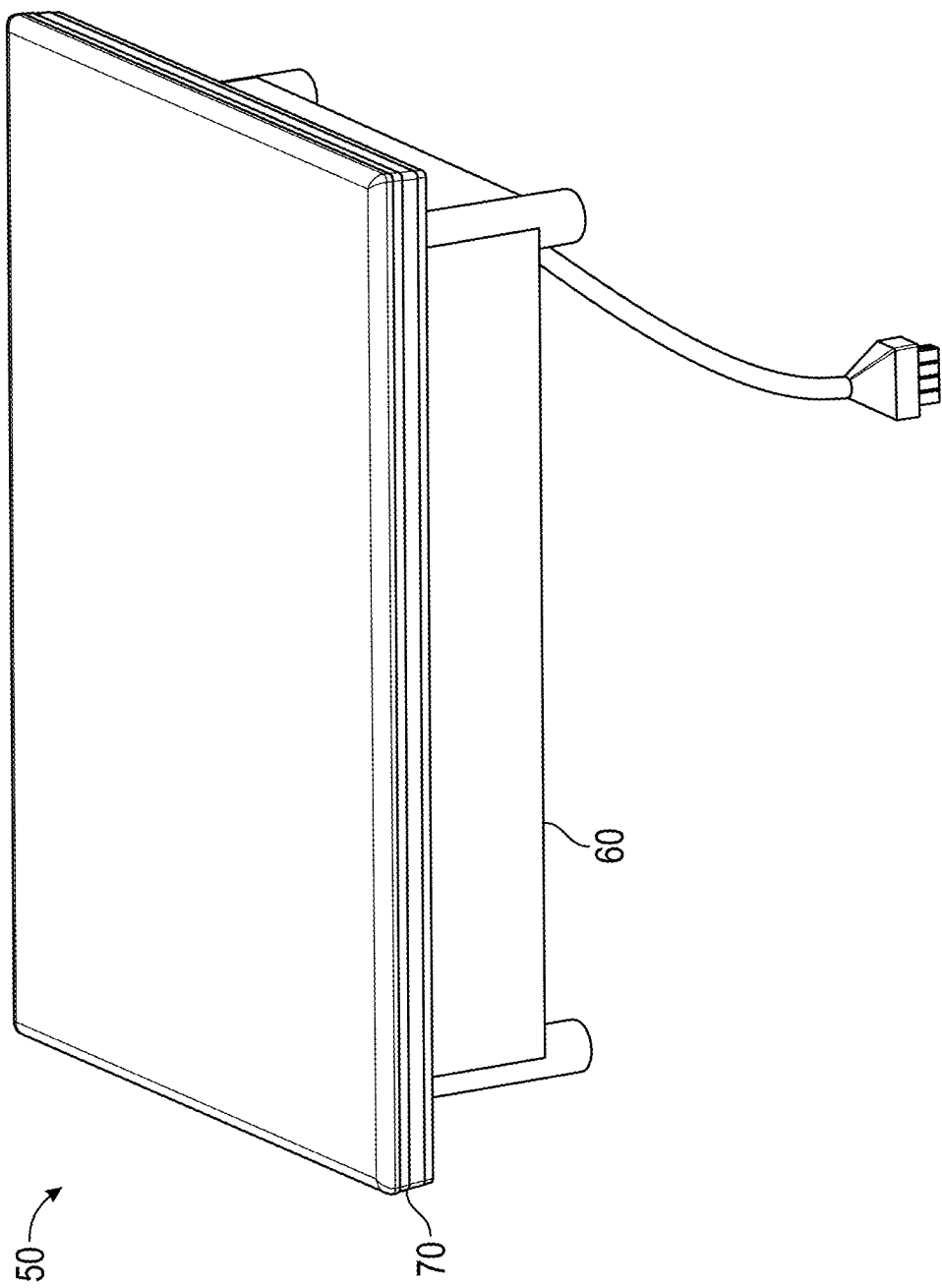
FIG. 1 is an isometric view of an exemplary embodiment of a user interface panel in accordance with aspects of the invention.
Figure 2:
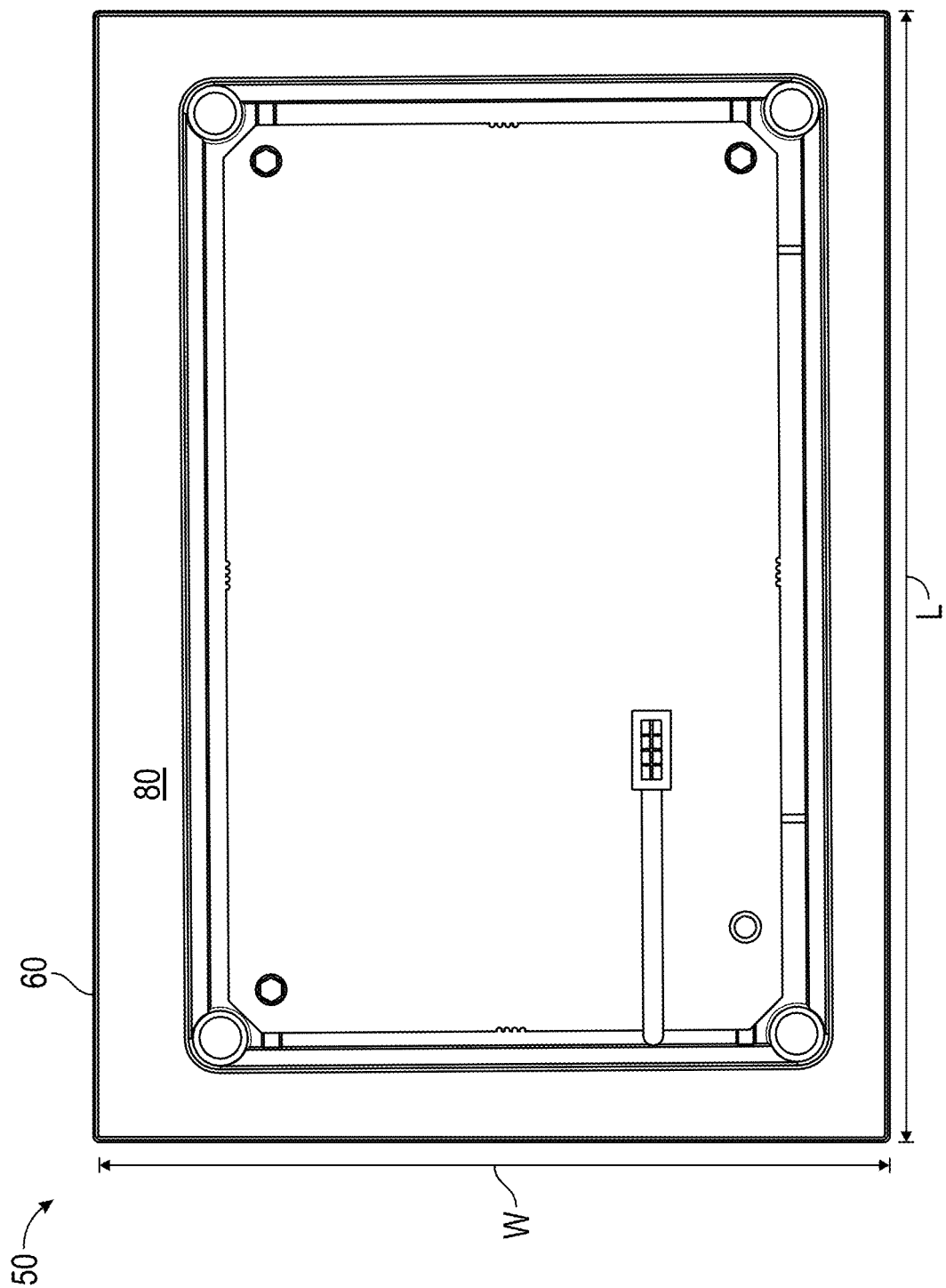
FIG. 2 is a bottom view of the interface panel of FIG. 1.
Figure 3:
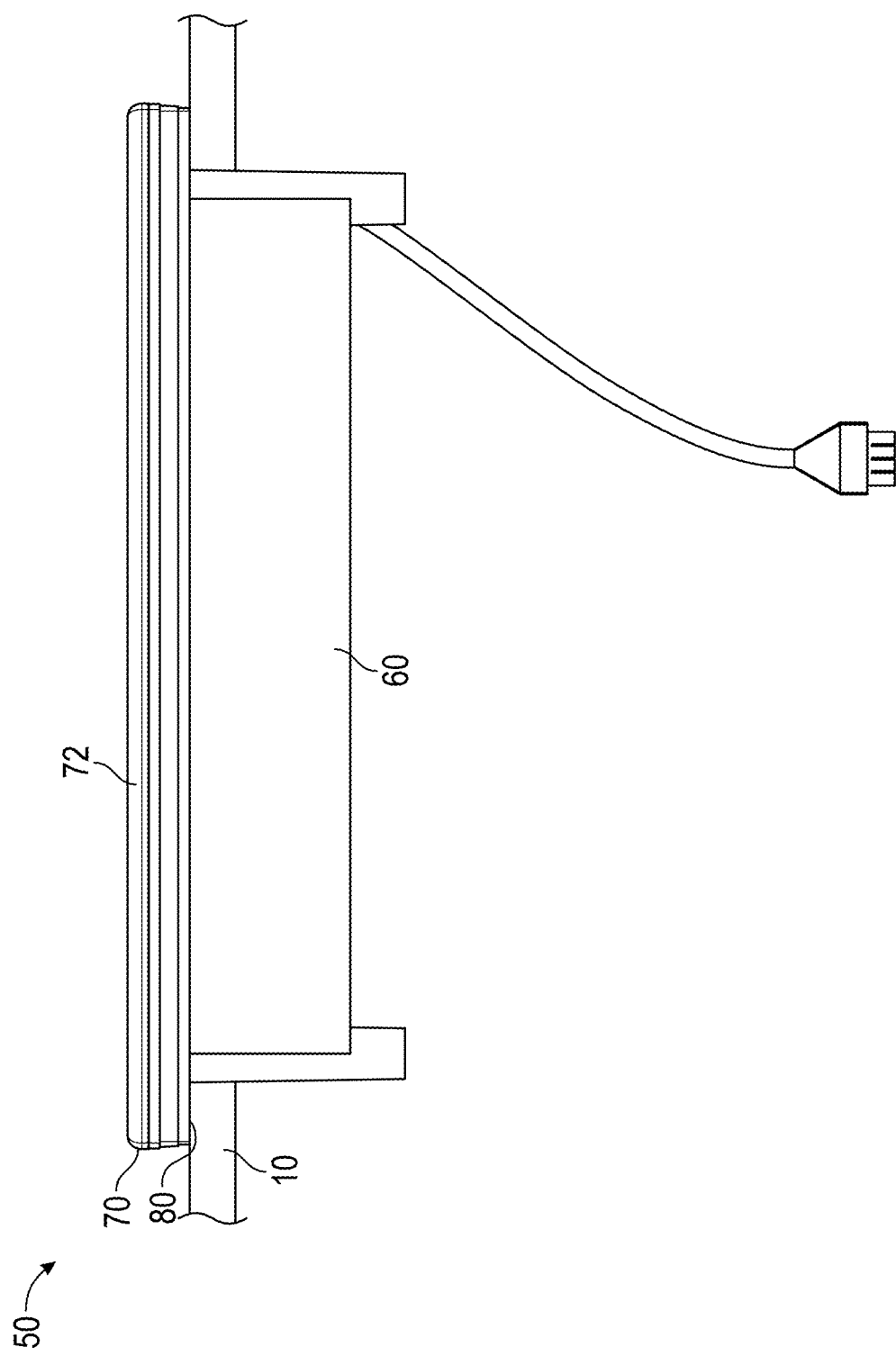
FIG. 3 is a front plan view of the interface panel of FIG. 1.

In the following detailed description and in the several figures of the drawing, like elements are identified with like reference numerals. The figures are not to scale, and relative feature sizes may be exaggerated for illustrative purposes.

In accordance with aspects of the invention, in an exemplary embodiment of a user interface display panel, a top or cover glass layer extends to the perimeter of the panel housing. A touch-sensitive display layer is adhered to the bottom surface of cover glass layer to form a touch sensitive display assembly and is just smaller in area than that of the cover glass layer to provide a peripheral lip region for adherence to a waterproof gasket to bond the cover glass and display layer to the housing structure. The display layer is supported above the surface of the tub wall. The arrangement results in an active touch-sensitive display area significantly larger than display areas provided in the past by interface panels.

An exemplary embodiment of an interface panel 50 is illustrated in FIGS. 1-10. The panel 50 includes a cover glass and touch-sensitive display assembly 70, a housing structure 60, a gasket 80 for securing the panel to a bathing installation surface, e.g. a spa top side, such as a tub wall surface 10 (FIG. 3) with an opening to receive the interface panel, and a circuit board 90 mounted within a receptacle 62C formed on the bottom of the housing structure, as more clearly shown in FIG. 4.

The assembly 70 includes the cover glass layer 72, typically fabricated of a high-strength glass such as chemically strengthened glass, and a thickness in a range of 3 to 4 mm. A touch-sensitive display system 74 has a flat planar top surface 74B bonded to the flat planar bottom surface 72A of the glass layer by optically transparent adhesive. In one embodiment, the system 74 preferably employs capacitive touch technology. In another embodiment, the system 74 employs resistive touch technology. Display systems with capacitive and resistive touch technology are commercially available.

In an exemplary embodiment, the glass layer 72 is dimensioned to overlay the entire front-facing area of the housing structure including the top flat surface 62; both the surface 62 and glass layer 72 are nominally the same length L and width W. In one exemplary embodiment, the dimensions W and L are 4.03 inches and 5.73 inches, respectively. In another embodiment, the dimensions W and L are 4.5 inches and 7.27 inches, respectively. In other embodiments, different dimensions may be used. The display system 74 includes a ribbon wiring cable 74A with a connector which connects to the circuit board 90 to supply power and drive signals.

The housing structure 60 is, in this exemplary embodiment, a unitary one-piece molded structure including the peripheral flat top surface 62 on flange portion 60A, and a recess 64 formed by a floor plate 62A. A bottom receptacle 62C is defined by floor plate 52A and a peripheral wall 62B. The display system 74 is sized to fit into the recess when the assembly 70 is assembled to the housing structure, with a small air space 64A (FIG. 4) between the bottom of the display system and the floor plate 62A. A narrow slot 66 (FIG. 5) is formed through the floor plate 62A, sized to allow the ribbon wiring cable and connector to be passed through to the circuit board 90. A receptacle 62C is formed by peripheral wall 62B, with a peripheral flange portion 60A (FIG. 4) extending outwardly and configured to extend over the edge of the tub wall surface 10 when the interface panel is installed in the tub.

Figure 6:
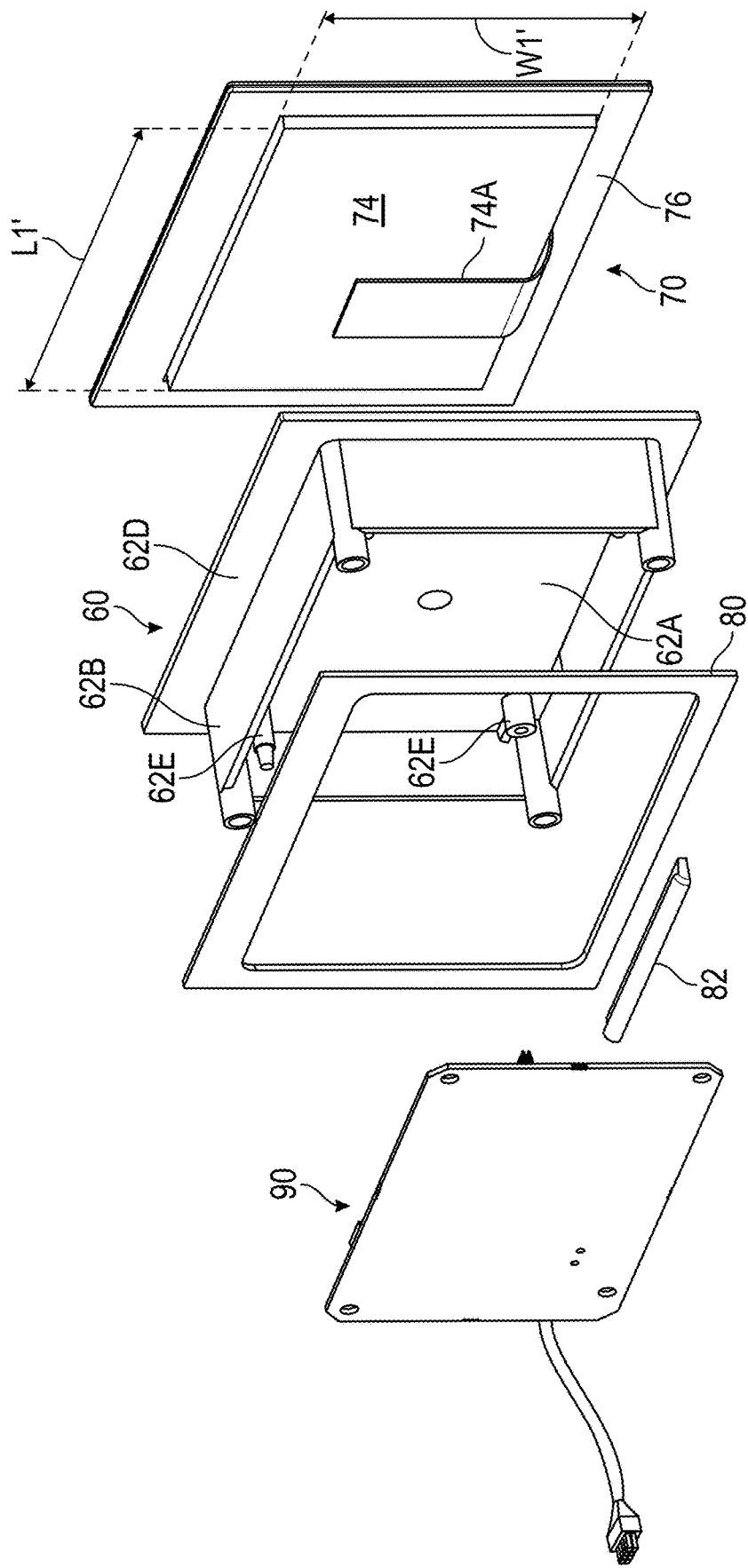
FIG. 6 is a bottom isometric exploded view of the interface panel of FIG. 1.

In an exemplary embodiment, the recess 64 has width and length dimensions W1, L1, respectively. The display system 74 is sized to just fit into the recess, so its dimensions are W1, L1 less respective tolerances to enable the fit into the recess, or W1', L1' (FIG. 6).

The active display area of the user interface panel 50 is W1'×L1', and the area of the panel top surface is W×L. In an exemplary embodiment, the dimensions are W=4.03 inches, L=5.73 inches, W1'=2.62 inches and L1'=4.33 inches, giving an active display area of 11.34 square inches, in relation to the panel top surface 23.15 square inches. This provides a display to total area ratio of 49%, substantially exceeding the corresponding ratio of known user interface panels for bathing installations. The display to total area ratio in an exemplary embodiment is at least 30%. In other embodiments, this ratio is at least 35%, at least 40%, at least 45% and at least 65%.

An aspect of the panel 50 is that the display system 74 when the panel is mounted in a tub wall is above the top surface of the tub wall. With this feature, the size of the display system is not limited to the size of the opening in the tub wall. This will be illustrated with respect to the alternate embodiment described with respect to FIG. 11 below.

Figure 4:
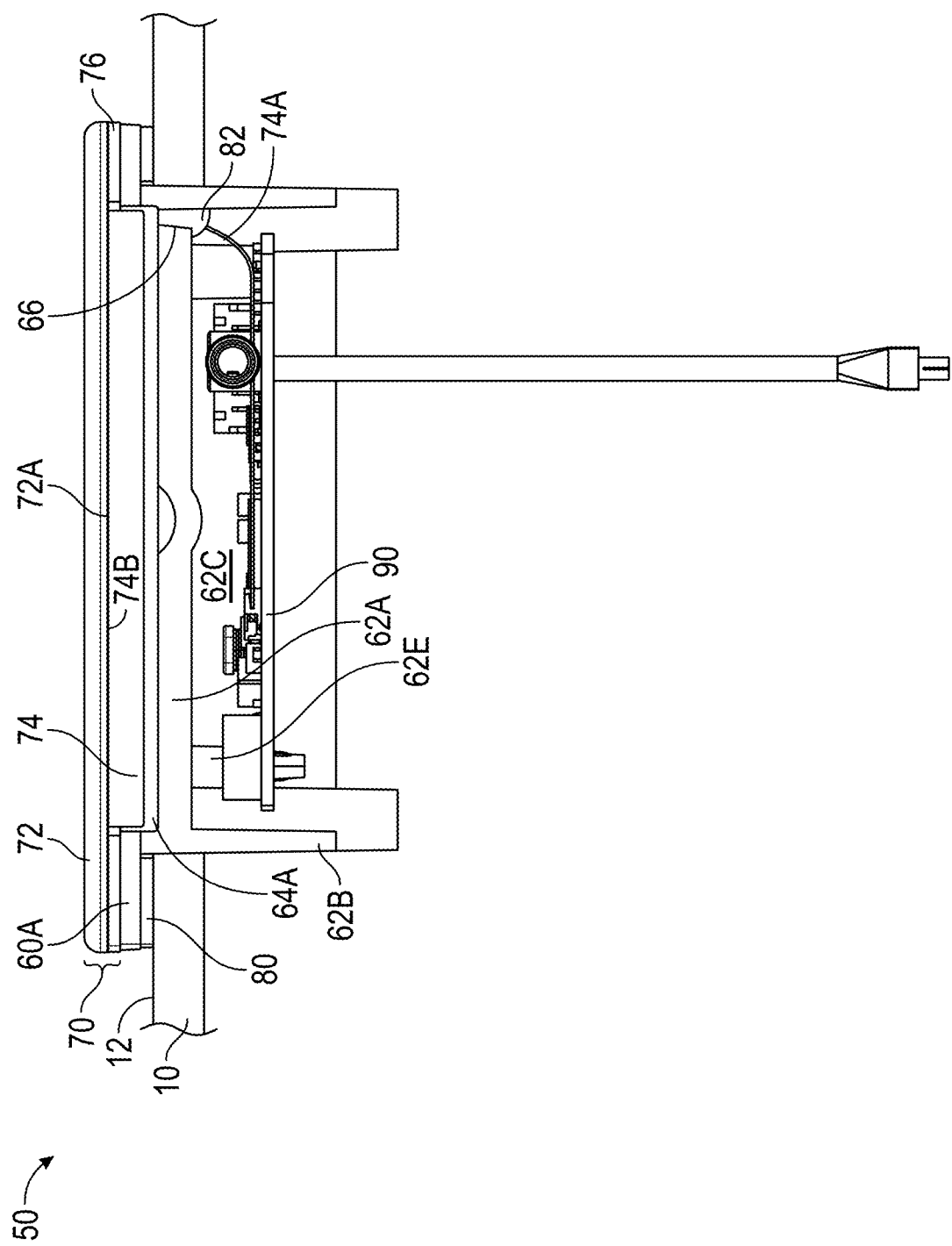
FIG. 4 is a cutaway view of the interface panel of FIG. 1.
Figure 5:
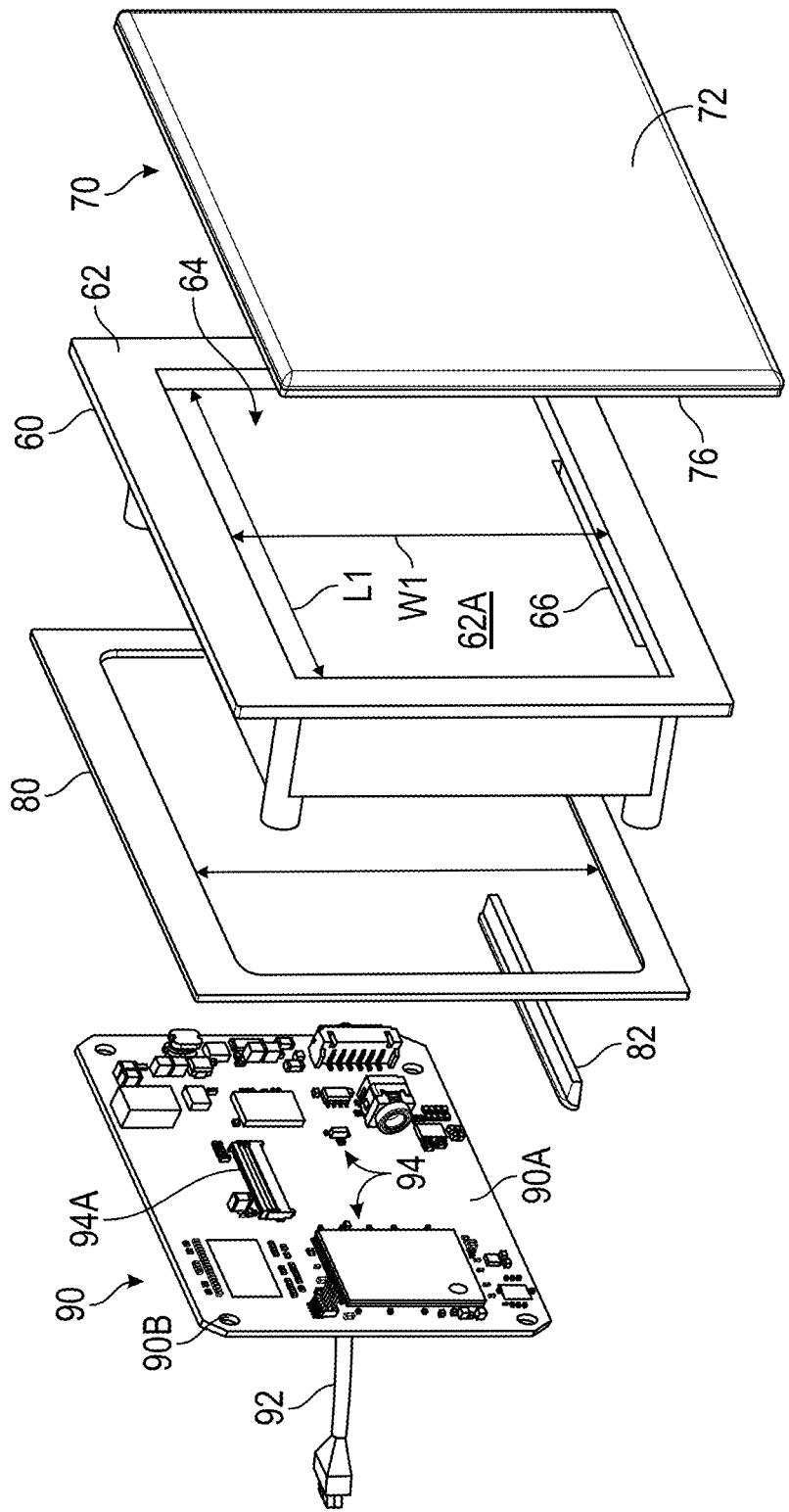
FIG. 5 is a top isometric exploded view of the interface panel of FIG. 1.

FIGS. 4 and 5 illustrate the circuit board assembly 90 in further detail. The assembly includes wiring board 90A, with corner openings 90B to secure the board to standoffs 62E extending downwardly from the floor plate 62A. Circuit components 94 are mounted on the board 90A; the components include the circuit components to drive the touch-sensitive display system, a connector 94A to connect the board assembly to the ribbon cable 74A. A cable 92 extends from the bottom of the board 90A to connect to a controller for the bathing installation, to receive power and control signals from the controller.

To allow the interface panel 50 to operate in a bathing installation, the panel is provided with features to resist moisture egress into the recess 64. The gaskets 76 and 80 are fabricated of waterproof materials, and provided with double-sided adhesive tape on upper and lower surfaces to adhere securely to the adjacent surfaces. A suitable gasket may be fabricated of 3M VHB tape, for example. To seal the slot 66 in the floor plate 62A after the ribbon cable 74A is passed through it during assembly, a liquid silicone elastomer is dispensed into the slot to cure and form a seal plug 82 (FIGS. 4 and 5). Once the circuit board 90 has been assembled into the lower receptacle 62C formed by peripheral wall 62B of the housing, the receptacle is filled with potting compound.

FIGS. 6-10 illustrate progressive steps in an exemplary assembly process for assembling the panel 50. FIG. 6 is an exploded view, illustrating the touch-sensitive display panel assembly 70, the housing 60, the gasket 80, seal plug 82 and circuit board 90.

Figure 7:
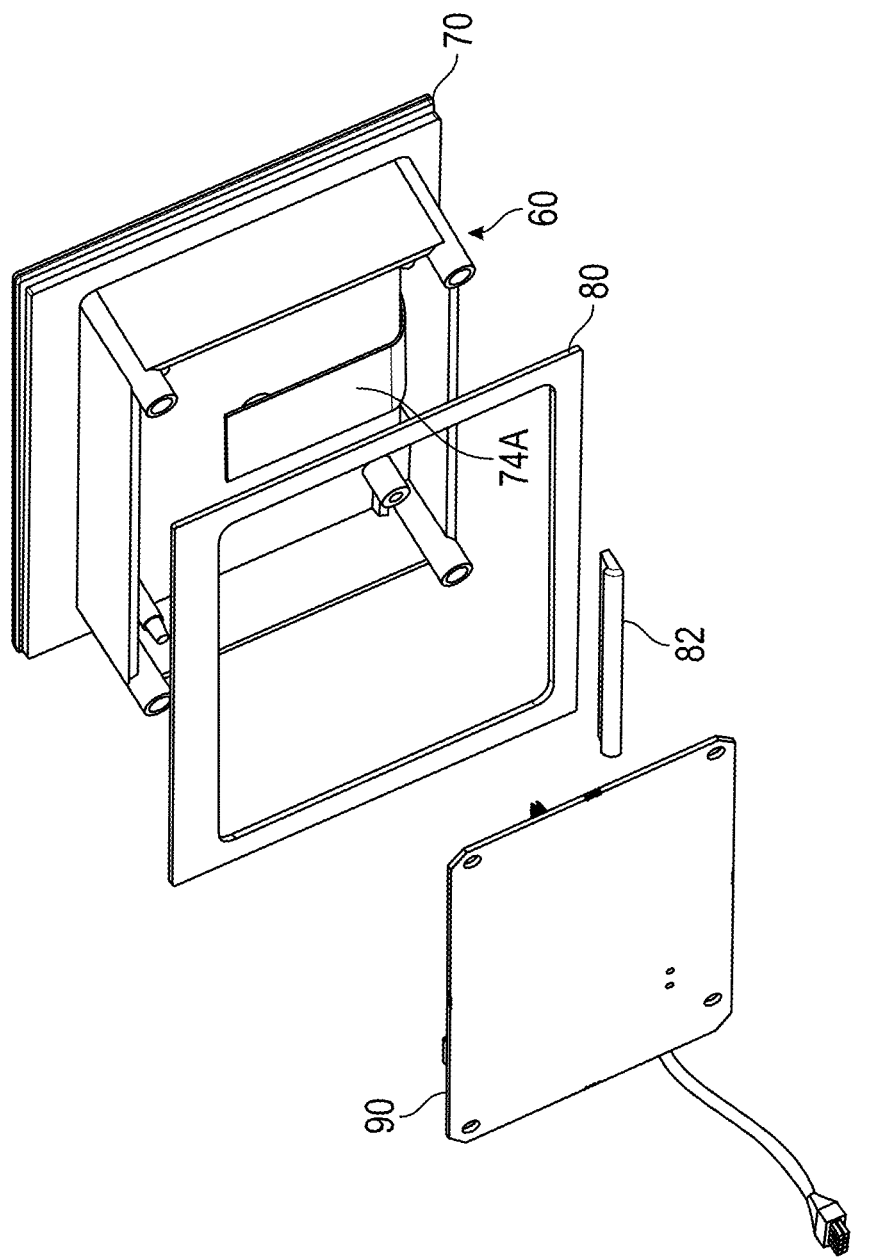
FIG. 7 is a bottom isometric view as in FIG. 6, with the glass-display assembly affixed to the housing.
Figure 8:
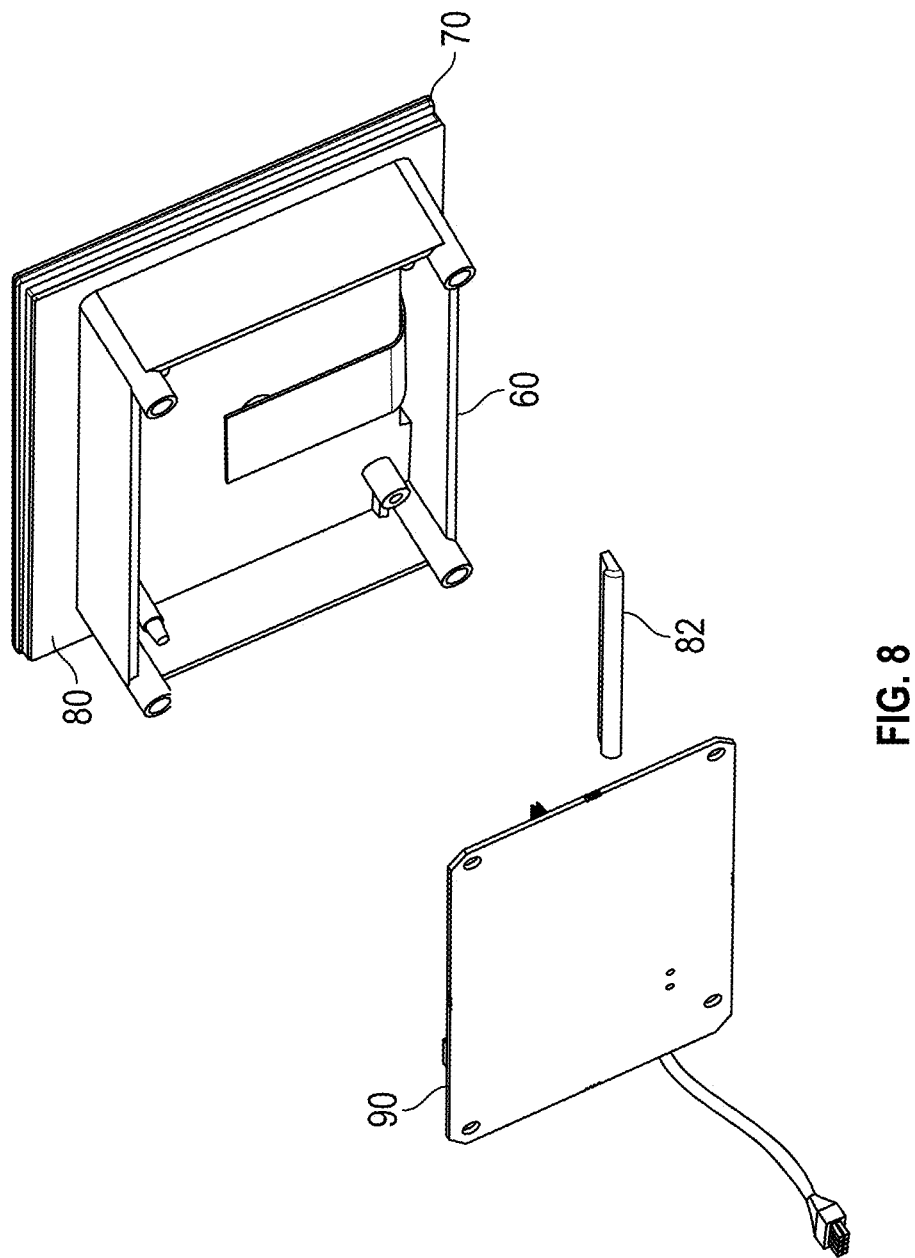
FIG. 8 is a bottom isometric view as in FIG. 7, with an adhesive gasket adhered to the housing to secure the housing to the shell wall of the bathing installation.
Figure 10:
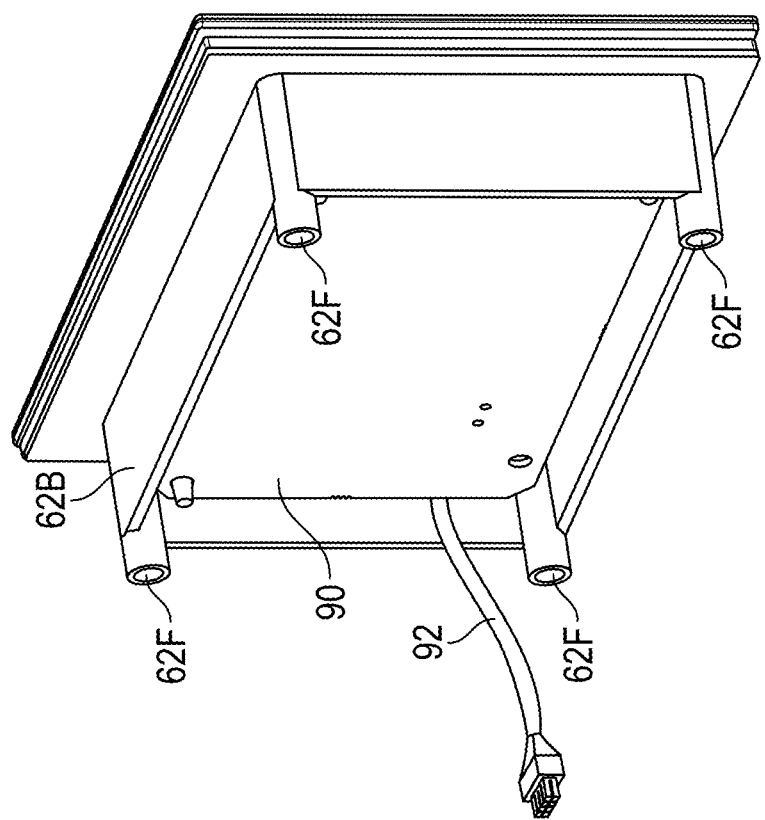
FIG. 10 is a bottom isometric view of the fully assembled interface panel.

FIG. 7 illustrates the display panel assembly 70 attached to the peripheral flat surface 62 of the housing structure 60 by adhesive gasket 76. The ribbon cable 74A has been passed through the slot 66 in the floor plate 62A. In FIG. 8, the gasket 80 has been attached to the peripheral flange surface 62D (FIG. 6). FIG. 9 illustrates the stage in the process in which the seal plug 82 has been dispensed into the slot. In FIG. 10, the circuit board has been attached to the standoffs 62E. The final step in the fabrication process is to dispense the potting material, such as a liquid silicone, into the receptacle to fill the internal space between the floor plate 62A and the circuit board, and to cover the circuit board 90.

A further feature of the interface panel 50 is the provision of open receptacles 62F formed in the corners of the peripheral wall 62B. The receptacles are configured to receive light emitters, such as LEDs or incandescent lamps. These light emitters may be controlled by the bathing installation controller. The housing 60 may be fabricated of a translucent material so that the light emitters illuminate the undersurface of the display assembly. Alternatively, the housing structure may be an opaque material, and the receptacle openings are through openings allowing light from the emitters to pass through the housing structure to the cover glass or display system.

Figure 11:
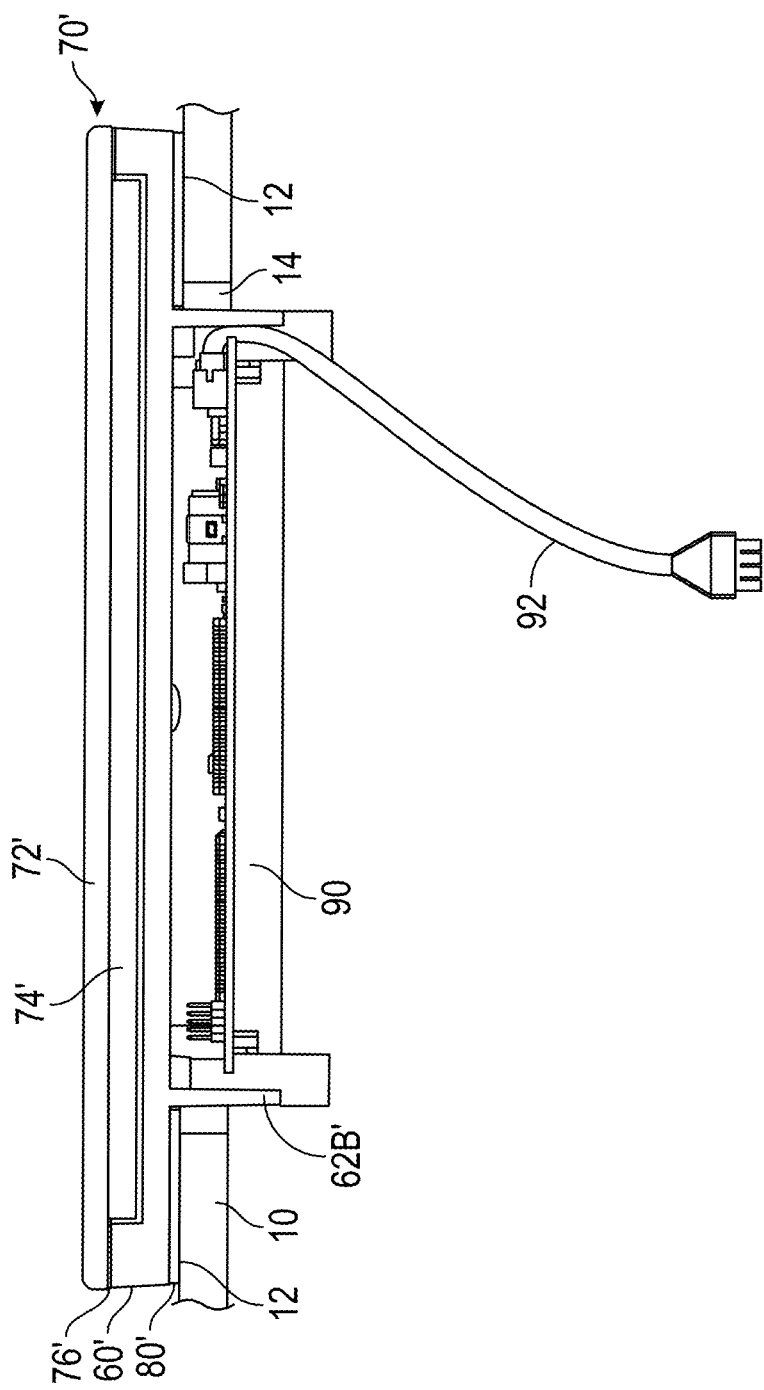
FIG. 11 is a cutaway view of an alternate embodiment of a user interface panel.
Figure 12B:
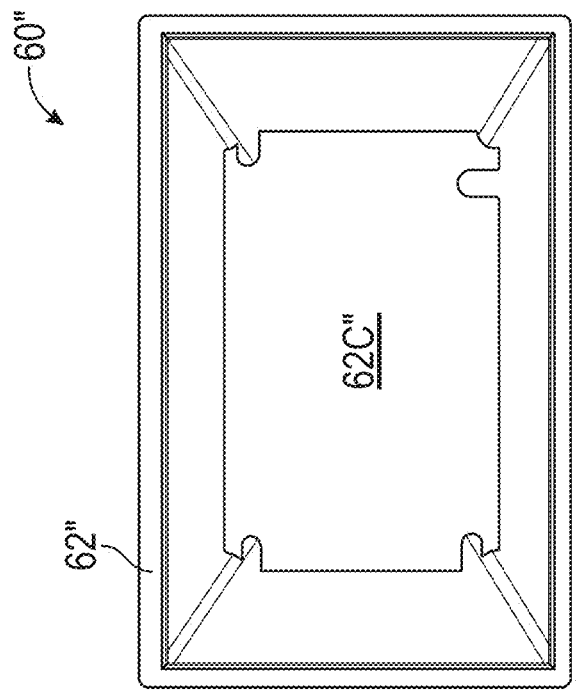
FIG. 12B is a top view of the housing structure.
Figure 12A:
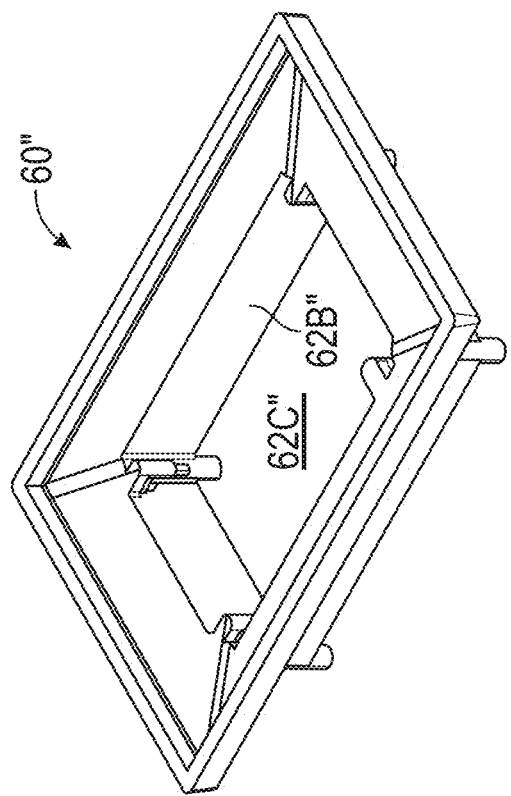
FIG. 12A is an isometric top view of a housing structure for an alternate embodiment of a user interface panel.
Figure 12D:
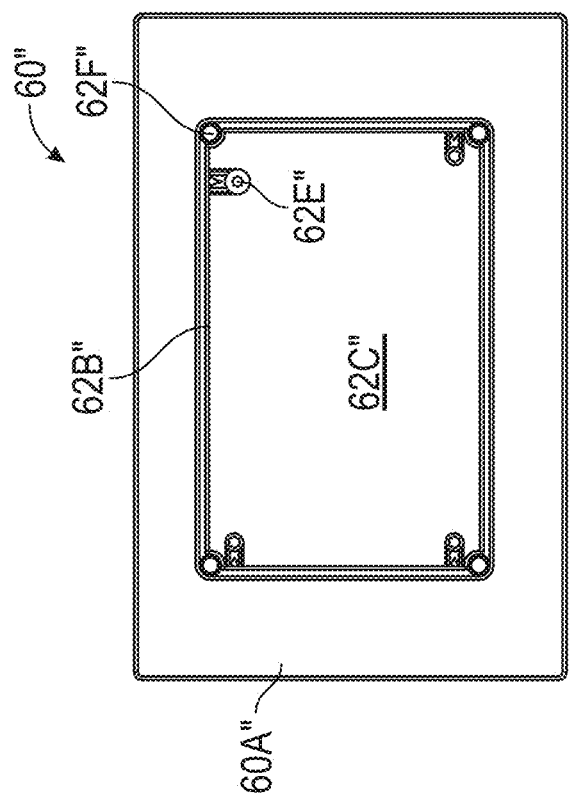
FIG. 12D is a bottom view of the housing structure.
Figure 12C:
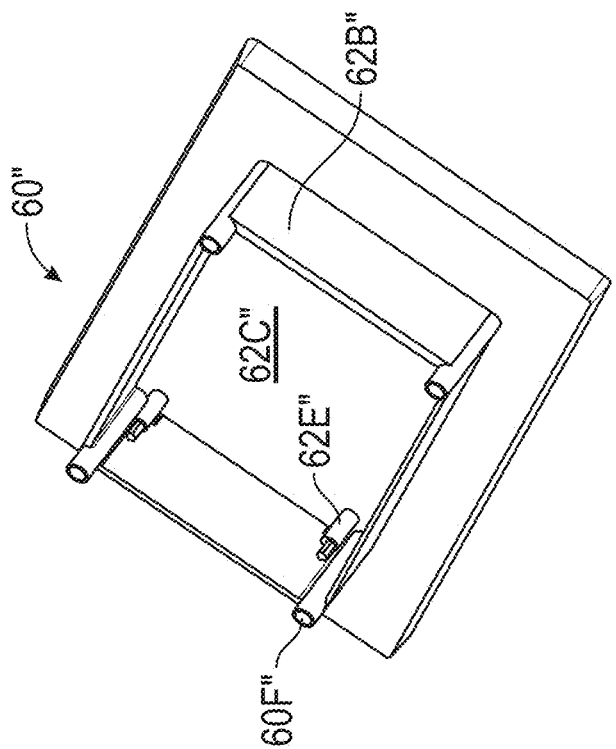
FIG. 12C is a bottom isometric view of the housing structure.

FIG. 11 illustrates an alternate embodiment of an interface panel 50'. In this embodiment, the housing structure 60' has a peripheral wall 62B' with an identical length and width to that of wall 62B in the first embodiment, so that the panel 50' may be fitted into the same diameter opening in the tub wall 10 as the panel 50, yet the active display area provided by display system 74' is much larger. The dimensions of the recess essentially filled by the display system 74' are enlarged with respect to those of the recess 62C of the panel 50. In this example, the corresponding dimensions of panel 50' are W=7.47 inches, W=4.58 inches, W1'=3.58 inches, L1'=6.29 inches, providing an active display area of 22.52 square inches, with an overall panel area of 34.21 square inches. This yields an active display area to total panel area ratio of 65.8%. The thickness of the housing flange is increased in relation to that of the panel 50 to allow the recess size to be enlarged, as depicted in FIGS. 4 and 11, respectively.

In the embodiment of FIG. 11, the cover glass layer 72' may be thicker than that of layer 72 of the panel 50. For example, the thickness of glass layer 72' may be 4 mm, while that of glass layer 72 may be 3 mm. Another feature is that the same circuit board assembly 90 may be used with either embodiment.

A further embodiment of an interface panel 50" is illustrated in FIGS. 12A-16B. The panel 50" employs a housing structure 60", shown in isolation in FIGS. 12A-12D. In contrast to the embodiments of FIGS. 1-11, the housing structure 60" omits the floor plate 62A, so that an open space 60C" is formed within the peripheral wall 62B" and extending upwardly to the flange portion 60A", with an open space portion 60C"-1 above the wiring board 90". Omitting the floor plate permits the potting material to seal around the display structure, providing a protection barrier. The interface panel 50" can provide as large an active display area in relation to the housing structure as the embodiment of FIG. 11.

The housing structure 60" in an exemplary embodiment is a unitary structure and may be injection molded from polycarbonate, ABS and other thermoplastic resins. The resin may be transparent, translucent or opaque. The housing structure 60" defines integrally formed receptacles 62F" for receiving light sources (not shown) such as LED emitters, to provide illumination in the case in which the housing structure is fabricated from a translucent or transparent material.

The interface panel 50" includes a touch-sensitive display assembly 70' which may be the assembly 70' described above for the embodiment of FIG. 11. The glass layer 72' is dimensioned to overlay the entire front-facing area of the housing structure 50" including the top flat surface 62". An adhesive gasket 76" attaches the display assembly 70' to the top flat surface 62". Another adhesive gasket (not shown) may be used to secure the interface panel 50" to a bathing installation tub wall, as in the embodiments of FIGS. 1-11.

The panel 50" includes a circuit board assembly 90" assembly, including wiring board 90A", with corner openings 90B" to secure the board to standoffs 62E" extending downwardly and integrally formed with the peripheral wall 62B". Circuit components 94" are mounted to the board 90A"; the components include the circuit components to drive the touch-sensitive display system, a connector 94A" to connect the board assembly to the ribbon cable 74A". A cable 92" extends from the board 90A" to connect to a controller for the bathing installation, to receive power and control signals from the controller. The wiring board 90A" includes one or more openings 90"-A, and is sized so that gaps 62C"-2 exist between the peripheral wall 62B" and the board perimeter 90"-B, which allow the sealant in liquid form dispensed into the panel during final assembly, and with the panel inverted, to flow past the wiring board and into the open space 62C"-1 (FIG. 14B) between the wiring board and the touch-sensitive display system. The sealant 96 subsequently cures to a solid or gelatinous state, to provide protection against physical damage and moisture egress to the circuit board assembly 90" and the touch-sensitive display system 70'.

FIGS. 13B and 16B diagrammatically show the interface panel 50" before the sealant has been dispensed into the opening 60C". The cable 92" is shown in FIG. 16B but omitted from FIG. 13B.

Figure 14A:
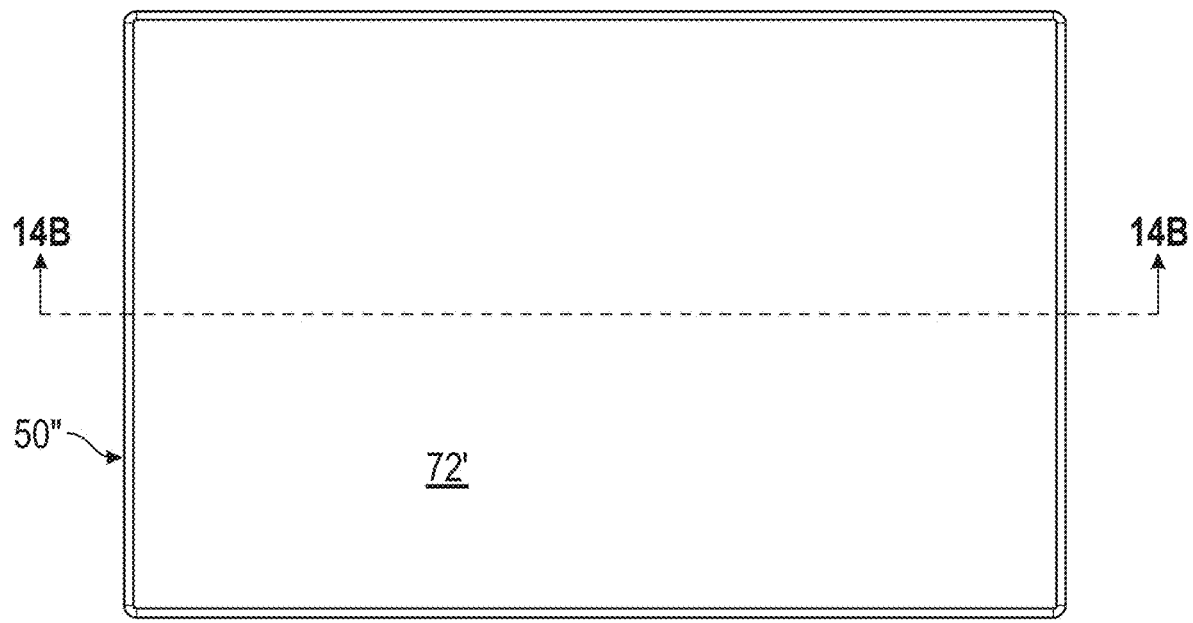
FIG. 14A is a top view of an alternate embodiment of a user interface panel using the housing structure of FIGS. 12A-12D.
Figure 14B:
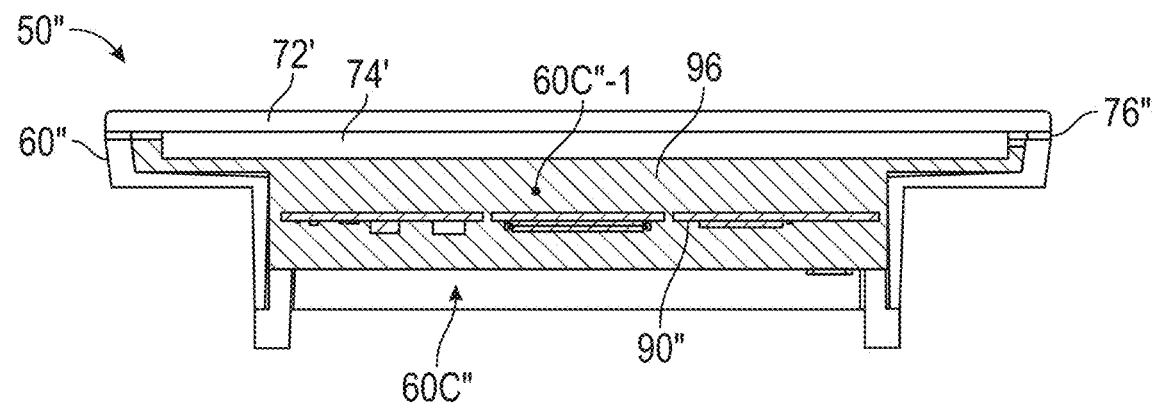
FIG. 14B is a simplified diagrammatic cross-sectional view taken along line 14B-14B of FIG. 14A, with cross-hatching showing the sealant after being dispensed into the panel.
Figure 15:
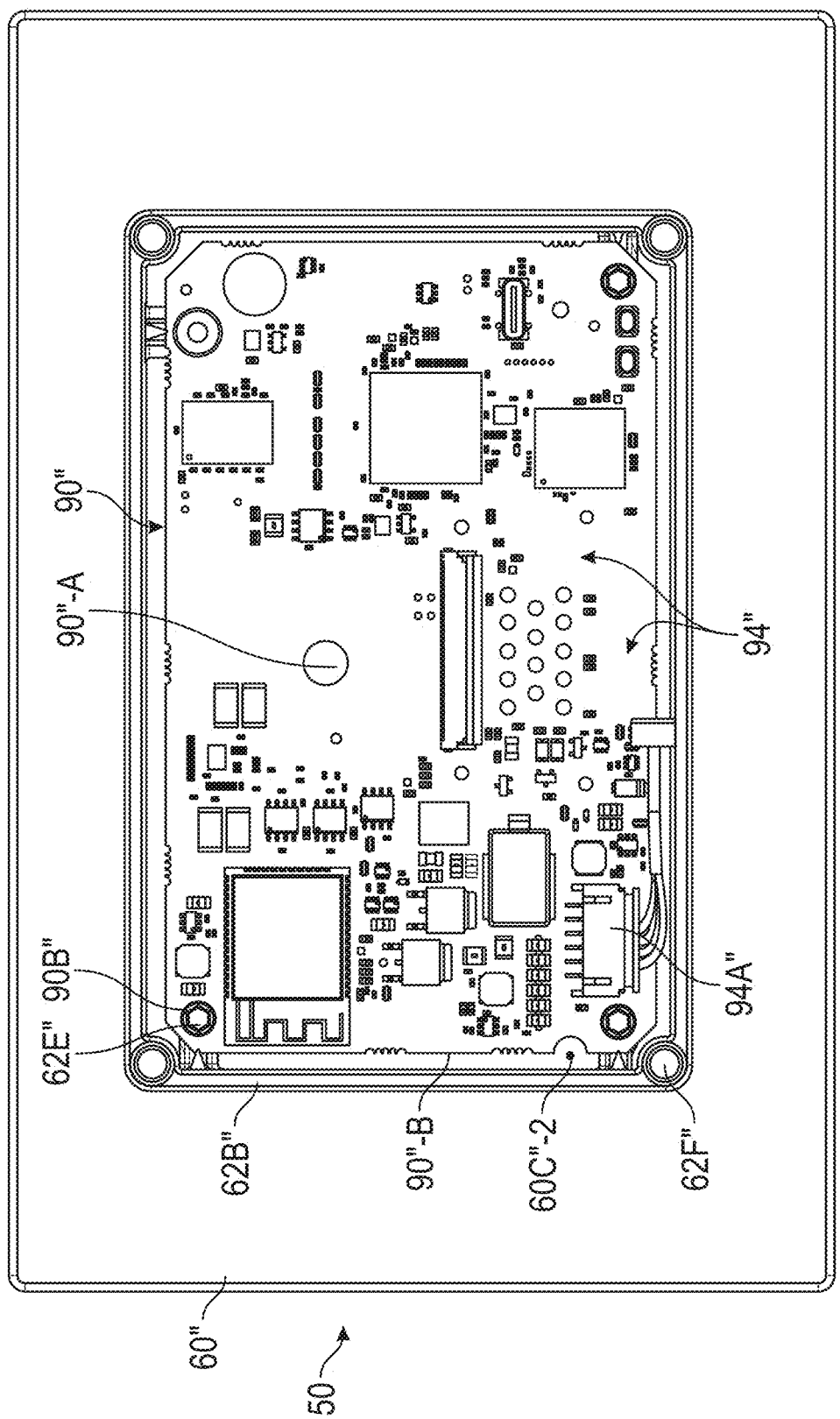
FIG. 15 is a view taken from the bottom of the panel embodiment of FIG. 13A, showing the printed wiring board assembly prior to sealant dispensing.

FIG. 14B is a diagrammatic cutaway view taken along line 14B-14B of FIG. 14A, with cross-hatching to show the sealant 96 once the sealant has been dispensed into the opening 60C" and flowed through and around the wiring board 90" to file the open space 60C"-1 between the wiring board and the bottom of the touch sensitive display assembly.

The sealant may, for example, be one of a silicone sealant or an epoxy.

Although the foregoing has been a description and illustration of specific embodiments of the subject matter, various modifications and changes thereto can be made by persons skilled in the art without departing from the scope and spirit of the invention.

The invention claimed is:

1. A user interface panel for installation in an opening in a wall of a bathing installation, the interface panel comprising:
    a housing structure defining a peripheral flange portion having a top flange surface and a bottom flange surface, a peripheral wall extending downwardly from the bottom flange surface, wherein a recess or open region is defined in the housing structure within the peripheral flange portion; and
    a touch-sensitive display assembly comprising a cover glass layer configured to cover an entire front-facing area of the interface panel and the housing structure, said entire front-facing area including the peripheral flange portion such that the cover glass layer covers the peripheral flange portion, wherein the interface panel has an outer perimeter defined by the cover glass layer, and a touch-sensitive display system having a display surface attached to a lower surface of the cover glass layer, the display system sized to fit into the recess or open region and having an active display area.

2. The interface panel of claim 1, wherein the housing structure is an integral one-piece structure fabricated of a plastic material.

3. The interface panel of claim 1, wherein the user interface panel is configured to support the display system above a top surface of the wall of the bathing installation.

4. The panel of claim 1, further comprising an adhesive gasket configured to adhere a lower surface of the peripheral flange portion to the wall surrounding the opening.

5. The panel of claim 1, wherein the entire front-facing area has a length dimension L and a width dimension W, and the cover glass layer has a length dimension L and a width dimension W, and the respective length and width dimensions of the front-facing area and the cover glass layer are nominally the same.

6. The panel of claim 1, wherein the cover glass is a chemically strengthened glass having a thickness in a range of three to four millimeters.

7. The panel of claim 1, wherein the touch-sensitive display system includes capacitive touch sensing technology.

8. The panel of claim 1, wherein a ratio of the active display area to the panel front-facing area exceeds 30%.

9. The panel of claim 1, wherein the housing structure further defines one or more emitter receptacles for light emitters to illuminate the panel.

10. The panel of claim 9, wherein the housing structure is fabricated of a translucent material so that light from the one or more emitter receptacles passes to the cover glass layer.

11. A user interface panel for installation in an opening in a wall of a bathing installation and having features to resist moisture egress, the interface panel comprising:
    a housing structure defining a peripheral flange portion having a top flange surface and a bottom flange surface, a peripheral wall extending downwardly from the bottom flange surface, wherein a recess or open region is defined in the housing structure within the peripheral flange portion;
    wherein the peripheral wall is configured to fit into the opening in the wall of the bathing installation, and the recess or open region has a dimension larger than a dimension of the opening;
    a touch-sensitive display assembly comprising a cover glass layer configured to cover the entire front-facing area of the panel and housing structure, said entire front-facing area including the peripheral flange portion, and a touch-sensitive display system having a display top surface attached to a lower surface of the cover glass layer, the display system sized to fit into the recess or open region and having an active display area.

12. The panel of claim 11, wherein the entire front-facing area has a length dimension L and a width dimension W, and the cover glass layer has a length dimension L and a width dimension W, and the respective length and width dimensions of the front-facing area and the cover glass layer are nominally the same.

13. The panel of claim 11, further comprising a second adhesive gasket configured to adhere a lower surface of the peripheral flange portion to the wall surrounding the opening.

14. The panel of claim 11, wherein the housing structure further defines one or more emitter receptacles for light emitters to illuminate the panel.

15. The panel of claim 14, wherein the housing structure is fabricated of a translucent material so that light from the one or more emitter receptacles passes to the cover glass layer.

16. The panel of claim 11, wherein a ratio of the active display area to the panel front-facing area is at least 40%.

17. The panel of claim 11, wherein a ratio of the active display area to the panel front-facing area is at least 65%.

18. The panel of claim 11, wherein the touch-sensitive display system includes capacitive touch sensing technology.

19. The panel of claim 11, wherein the housing structure is an integral one-piece structure fabricated of a plastic material.

20. The panel of claim 11, wherein the user interface panel is configured to support the display system above a top surface of the wall of the bathing installation.

21. A user interface panel for installation in an opening in a wall of a bathing installation, the interface panel comprising:
- a housing structure defining a peripheral flange portion having a top flange surface and a bottom flange surface, a peripheral wall extending downwardly from the bottom flange surface, wherein a recess or open region is defined in the housing structure within the peripheral flange portion; and
- a touch-sensitive display assembly comprising a cover glass layer configured to extend to an outer perimeter of the panel housing structure including the peripheral flange portion, wherein the interface panel has an outer perimeter defined by the cover glass layer, and a touch-sensitive display system having a display surface attached to a lower surface of the cover glass layer, the display system sized to fit into the recess or open region and having an active display area.

* * * * *